R. VOSE.
Car-Springs.
No. 6,037.
Reissued Sept. 1, 1874.
Fig. 1.
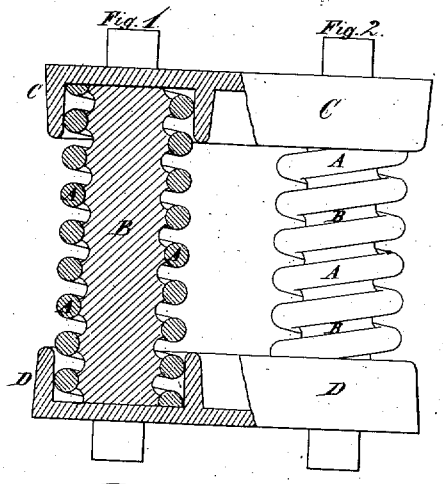
Fig. 2.
Fig. 3.
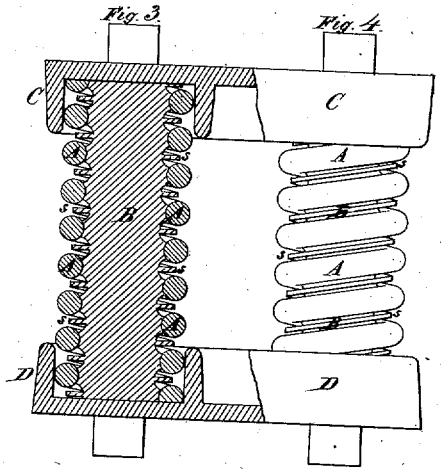
Fig. 4.
Fig. 5.
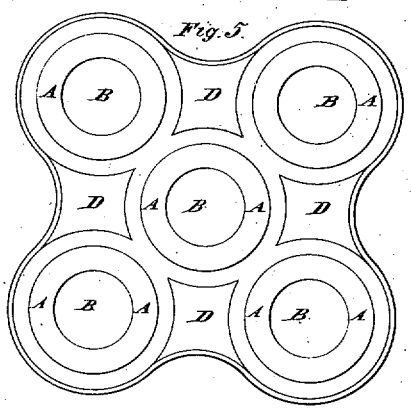
Fig. 6.
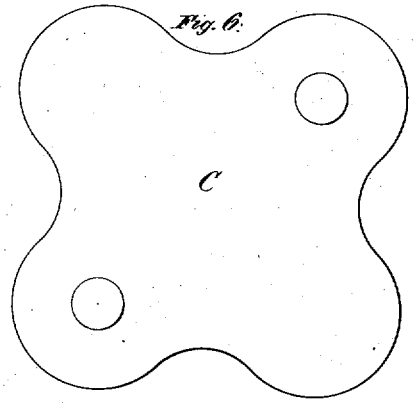
Fig. 8.
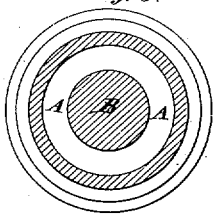
Fig. 7.
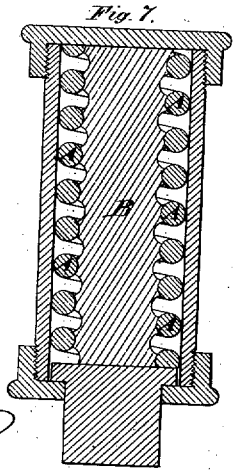
Fig. 9.
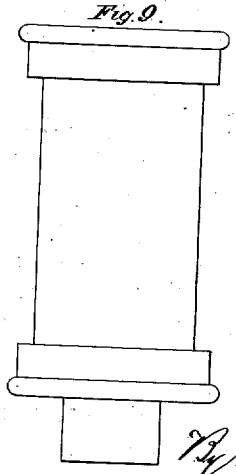
Fig. 10.
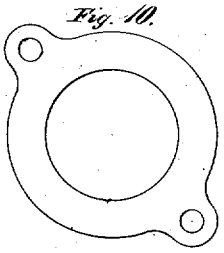
Witnesses:
A. S. Fitch.
B. Weaver
Inventor:
Richard Vose
By Fitch & Co.
his attorneys.

UNITED STATES PATENT OFFICE.

RICHARD VOSE, OF NEW YORK, N. Y., ASSIGNOR, BY MESNE ASSIGNMENTS, TO NATIONAL SPRING COMPANY.

IMPROVEMENT IN CAR-SPRINGS.

Specification forming part of Letters Patent No. 51,368, dated December 5, 1865; reissue No. 6,037, dated September 1, 1874; application filed September 7, 1871.

*To all whom it may concern:*

Be it known that I, RICHARD VOSE, of the city, county, and State of New York, have invented a new and useful Improvement in Springs for Railway-Cars and other purposes, of which the following is a specification, reference being had to the accompanying drawings forming part thereof.

Figure 1 is a central sectional view, and Fig. 2 an elevation, of a spiral steel spring combined with a column of india-rubber placed within the spiral, and embodying one part of my invention. Figs. 3 and 4 are similar views of a modification of the same spring. Fig. 5 is a top view of several spiral steel springs with rubber columns within the said steel springs, arranged in a group within a metal cap and base, designed to constitute together a single railway-car spring, the cover of the case being in this figure removed. Fig. 6 is a top view of the said group with the cap on. Fig. 7 is a central sectional view of a combined spiral and rubber spring inclosed in a single cell or case, Fig. 8 being a view of a cross-section of the same. Fig. 9 is an elevation of the same case; and Fig. 10, a top view of the same.

My invention relates, first, to the combination of two or more combined steel spiral and rubber springs grouped within a suitable cap and base, so that the group shall constitute one spring; second, to so combining a rubber center or core with an encircling metallic spiral spring, as that the rubber shall adhere and be firmly united to the coils of the metallic spring; third, combining with the interior of a coiled metallic spring a central column of india-rubber that has a spiral groove on its outer surface, for the purpose of giving room within the spiral spring for the displacement or change of form of the rubber when longitudinally compressed.

In manufacturing my spring, I first form a metallic coil, A, of steel in the usual manner. This spiral spring I then re-enforce, by inserting a column of rubber, B, (or its equivalent in gutta-percha,) in the spiral, as seen in Figs. 1 and 3.

I have found by experiment and trial that the rubber and steel spiral more effectually co-operate with each other in their combined action in this spring, when they are made to adhere together, and they may be thus united either by inserting the rubber in the spiral before it is vulcanized, and then curing it by subjecting it to the requisite heat with the coil, or the rubber may be first vulcanized and then cemented to the spiral by some suitable cement. I prefer the former method; but when that is employed the temper of the steel spiral must be at the outset several degrees higher than is required in the completed spring, so that the heat applied in curing the rubber shall not reduce the temper of the steel too low.

When a plain, solid column of rubber is combined with the interior of a strong spiral steel spring to re-enforce it, there being no opportunity within the spiral for the displacement or change of form of the rubber when longitudinally compressed, the elasticity of the rubber is greatly restricted, and portions of the exterior surface will necessarily be forced outward between the several coils, obstructing the movements of the coils and abrading the rubber. These results are obviated and an improvement effected by molding the rubber column with a spiral groove upon its exterior surface. The groove when made should have the same pitch as the coils of the metallic spring, as shown by the drawings, and be so placed within the metallic spring that the grooves in the rubber shall coincide with the intervals between the metallic coils.

If it is desired that there shall be some packing between the coils, to prevent their coming in contact with each other, a projecting fin, S, Fig. 3, may be left upon the rubber projecting centrally from in and along the spiral groove in the outer surface of the rubber column, as seen in Fig. 3, or else the spiral groove in the rubber may be formed large enough to receive the metallic coil without embracing it closely, leaving the thread separating and defining the groove in the rubber to project slightly between the coils.

The drawings represent a spring of about one-half the size I have adopted.

When a large mass of rubber is encircled by a spiral steel spring that is made of iron or of a rod of proportionate size, or, in other words, of a sufficient size to resist the outward pressure of the rubber when compressed, a hard and comparatively unelastic combination is produced. Hence, when I desire to produce a spring of great bearing power for railway-cars, I group together a number of the combined rubber and spiral steel coils, about double the size represented in the drawings, having a suitable cap and base, as seen in Figs. 5 and 6, thus forming a combination that constitutes in its action a single spring of any required power of resistance, while it has great elasticity and range of motion.

The cap and base C and D, Figs. 5 and 6, are made of cast-iron to receive a number of my combined rubber and spiral steel springs, and retain them in position, so that they will not come in contact with each other while they have freedom of vertical motion.

I am aware that springs have been made in which a solid column of india-rubber has been combined with the interior of a steel spiral spring. I am also aware that railway-car springs have been made by grouping together a number of small-sized spiral steel springs alone, and also when combined with wool; but I believe I am the first who ever united in the same combination the advantages of the combined steel spiral and interior rubber column, and of a grouping together of a number of these combined rubber and steel springs to form one powerful car-spring.

What I claim, therefore, as my invention, and desire to secure by Letters Patent, is—

1. A car-spring, composed of two or more spiral springs, in the interior of which are combined columns of india-rubber, all grouped and contained in a cap and base, substantially as and for the purpose specified.

2. The combination, with, and in the interior of, a spiral metallic spring, of a column of rubber that is spirally grooved on the outside, substantially as and for the purpose specified.

3. The combination, with, and in the interior of, a spiral metallic spring, of a column of rubber, the rubber and metal cemented together, substantially as and for the purpose specified.

RICHD. VOSE.

Witnesses:
I. P. FITCH,
JAS. GILLET.